United States Patent
Foster

(10) Patent No.: US 10,604,138 B2
(45) Date of Patent: Mar. 31, 2020

(54) TORQUE TRANSFER DRIVE SYSTEM

(71) Applicant: JAGUAR LAND ROVER LIMITED, Warwickshire (GB)

(72) Inventor: Jaimie Foster, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 0 days.

(21) Appl. No.: 16/033,306

(22) Filed: Jul. 12, 2018

(65) Prior Publication Data

US 2019/0016328 A1 Jan. 17, 2019

(30) Foreign Application Priority Data

Jul. 12, 2017 (GB) .................................. 1711176.6

(51) Int. Cl.
*B60W 10/119* (2012.01)
*B60K 17/16* (2006.01)
*B60K 17/342* (2006.01)
*B60K 17/02* (2006.01)
(Continued)

(52) U.S. Cl.
CPC .......... *B60W 10/119* (2013.01); *B60K 17/02* (2013.01); *B60K 17/165* (2013.01); *B60K 17/342* (2013.01); *B60K 23/08* (2013.01); *B60K 23/0808* (2013.01); *B60K 17/344* (2013.01);
(Continued)

(58) Field of Classification Search
CPC . B60W 10/119; B60K 17/344; B60K 23/0808
See application file for complete search history.

(56) References Cited

U.S. PATENT DOCUMENTS

| 2007/0093341 A1* | 4/2007 | Supina | B60L 50/61 475/5 |
| 2007/0225887 A1* | 9/2007 | Morris | B60W 10/11 701/51 |
| 2014/0135168 A1 | 5/2014 | Yokoo | |

FOREIGN PATENT DOCUMENTS

| DE | 19639904 A1 | 5/1997 |
| GB | 2545689 A | 6/2017 |

OTHER PUBLICATIONS

Combined Search and Examination Report under Sections 17 and 18(3) for Application No. GB1711176.6 dated Dec. 21, 2017 (6 pages).

* cited by examiner

Primary Examiner — Mark J Beauchaine
(74) Attorney, Agent, or Firm — Carlson, Gaskey & Olds

(57) ABSTRACT

A driveline system comprising a prime mover configured to provide torque to at least a first group of wheels; an electric machine configured to provide torque to at least a second group of wheels; a torque transfer drive comprising a first side and a second side and configured to enable torque generated by the prime mover to be provided from the first side to the second side for provision to the second group of wheels; a first disconnect device configured to, in a first connect configuration, transmit torque from the prime mover to the first side of the torque transfer drive and, in a first disconnect configuration, prevent transmission of torque from the prime mover to the first side of the torque transfer drive; and a second disconnect device configured to, in a second connect configuration, transmit torque between the electric machine and the second side of the torque transfer drive and, in a second disconnect configuration, prevent transmission of torque between the electric machine and the second side of the torque transfer drive.

15 Claims, 4 Drawing Sheets

(51) Int. Cl.
 B60K 23/08 (2006.01)
 *B60K 17/344* (2006.01)
(52) U.S. Cl.
 CPC ... *B60K 2023/085* (2013.01); *B60Y 2400/424* (2013.01)

TORQUE TRANSFER DRIVE SYSTEM

TECHNICAL FIELD

The present disclosure relates to a torque transfer drive system. In particular, but not exclusively it relates to a torque transfer drive system in a driveline system of a vehicle.

At least some aspects of the invention relate to a torque transfer drive system, a driveline system, a method of controlling a driveline system, a controller, and a vehicle.

BACKGROUND

Vehicle driveline systems may be operable in two-wheel drive (2WD) modes and four-wheel drive (4WD) modes.

In 2WD modes, torque output from a prime mover is provided to only the front wheels and not the rear wheels (front wheel drive (FWD)) or provided to only the rear wheels and not the front wheels (rear wheel drive (RWD)). In FWD mode the transmission of torque output from the prime mover to the rear wheels is prevented and in RWD mode the transmission of torque output from the prime mover to the front wheels is prevented. In 4WD modes, all four wheels (e.g., front wheels and rear wheels) are operatively coupled to the prime mover such that torque output from the prime mover is transmitted to all four wheels by means of a front driveline and a rear driveline.

2WD modes provide greater fuel economy than 4WD modes and 4WD modes provide greater vehicle stability than 2WD modes. Therefore it is desirable to operate a driveline system in a 2WD mode during on-road driving in normal conditions but switch to operation in 4WD when conditions are such that 4WD is beneficial (e.g., automatically when wheel slip is detected due, for example, to icy roads or off-road terrain such as mud or sand). Vehicle driveline systems are able to switch between two-wheel drive (2WD) modes and four-wheel drive (4WD) modes automatically and/or manually while the vehicle is moving.

In order to switch the operation of driveline systems from 2WD modes to 4WD modes while the vehicle is moving it is necessary to synchronise the front driveline (in FWD mode) or the rear driveline (in RWD mode) with the front wheels or rear wheels respectively while the vehicle is moving. Once the speed of the driveline matches the wheel speed a disconnect device can be controlled to enable transmission of torque output from the prime mover via the driveline to the wheels.

It is an aim of the present invention to improve the aforementioned switching of a driveline system.

SUMMARY OF THE INVENTION

Aspects and embodiments of the invention provide a torque transfer drive system, a driveline system, a method of controlling a driveline system, a controller, and a vehicle as claimed in the appended claims.

According to an aspect of the invention there is provided a driveline system comprising a prime mover configured to provide torque to at least a first group of wheels; an electric machine configured to provide torque to at least a second group of wheels; a torque transfer drive comprising a first side and a second side and configured to enable torque generated by the prime mover to be provided from the first side to the second side for provision to the second group of wheels; a first disconnect device configured to, in a first connect configuration, transmit torque from the prime mover to the first side of the torque transfer drive and, in a first disconnect configuration, prevent transmission of torque from the prime mover to the first side of the torque transfer drive; and a second disconnect device configured to, in a second connect configuration, transmit torque between the electric machine and the second side of the torque transfer drive and, in a second disconnect configuration, prevent transmission of torque between the electric machine and the second side of the torque transfer drive.

This provides the advantage that the torque transfer drive can be isolated from torque output by the prime mover and/or the electric machine and therefore torque losses due to spinning up the torque transfer drive are reduced. In some examples the torque losses are eliminated.

In some but not necessarily all examples the first disconnect device is a continuously variable device and the second disconnect device is an on/off device.

This provides the advantage that the first disconnect device can modulate the amount of torque output from the prime mover that is transmitted to the first side of the torque transfer drive and the second disconnect device can prevent transmission of torque to the second side of the torque transfer drive without energy loss to heat generation.

In some examples the first disconnect device comprises a first clutch. The first clutch is configured to, in the first connect configuration, connect a first propshaft to the first side of the torque transfer drive and, in the first disconnect configuration, disconnect the first propshaft from the first side of the torque transfer drive. The first propshaft is driven by torque output from the prime mover.

In some but not necessarily all examples the first clutch is a friction clutch.

In some but not necessarily all examples the electric machine is concentrically mounted on a second propshaft.

This provides the advantage of minimising the space required to accommodate the electric machine in the driveline system.

In other examples the electric machine is connected in series between the second side of the torque transfer drive and the second group of wheels.

In some examples the second disconnect device comprises a second clutch configured to, in a third connect configuration, connect the second propshaft to the second side of the torque transfer drive and, in a third disconnect configuration, disconnect the second propshaft from the second side of the torque transfer drive.

In some but not necessarily all examples the second clutch is a first locking clutch.

In some but not necessarily all examples the second disconnect device comprises a third clutch configured to, in a fourth connect configuration, transmit torque between the electric machine and the second propshaft and, in a fourth disconnect configuration, prevent transmission of torque between the electric machine and the second propshaft.

In some but not necessarily all examples the third clutch is a second locking clutch.

When the second disconnect device is in the second connect configuration, the second clutch is in the third connect configuration and the third clutch is in the fourth connect configuration.

When the second disconnect device is in the second disconnect configuration, at least one of the second clutch and the third clutch is in the third disconnect configuration or the fourth disconnect configuration respectively.

In some but not necessarily all examples a third disconnect device is configured to, in a fifth connect configuration, enable transmission of torque between the second propshaft and the second group of wheels and, in a fifth disconnect configuration, prevent the transmission of torque between the second propshaft and the second group of wheels.

According to another aspect of the invention there is provided a method of controlling the aforementioned driveline system comprising: determining a required mode of operation; and in dependence upon the required mode of operation, controlling the first disconnect device to have the first connect configuration or the first disconnect configuration and controlling the second disconnect device to have the second connect configuration or the second disconnect configuration.

In some examples controlling the second disconnect device to have the second disconnect configuration comprises controlling the second clutch to have the third disconnect configuration.

In some examples controlling the second disconnect device to have the second disconnect configuration comprises controlling the third clutch to have the fourth disconnect configuration.

In some but not necessarily all examples the electric machine is controlled to operate as a motor or as a generator in dependence upon the required mode of operation.

This provides the advantage that, with the reduction in energy losses from spinning up elements of the driveline system, the electric machine can be used to increase the state of charge of the vehicle battery at a higher rate.

According to a further aspect of the invention there is provided a controller configured to perform the aforementioned method. The controller may be an electronic controller. The controller may be configured to perform the aforementioned method automatically in response to sensor inputs.

In some examples, a set of instructions are provided which, when executed, cause said controller to implement the control techniques described herein (including the aforementioned method). In some examples, the set of instructions are embedded in a non-transitory computer readable media.

According to a further aspect of the invention there is provided a vehicle comprising the aforementioned driveline system.

According to a further aspect of the invention there is provided a torque transfer drive system comprising: a torque transfer drive comprising a first side and a second side and configured to enable torque to be transmitted between the first side and the second side; a first disconnect device configured to, in a first connect configuration, transmit torque between the first motor via the first driveline and the first side of the torque transfer drive and, in a first disconnect configuration, prevent transmission of torque between the first motor via the first driveline and the first side of the torque transfer drive; and a second disconnect device configured to, in a second connect configuration, transmit torque between a second motor via the second driveline and the second side of the torque transfer drive and, in a second disconnect configuration, prevent transmission of torque between the second motor via the second driveline and the second side of the torque transfer drive.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
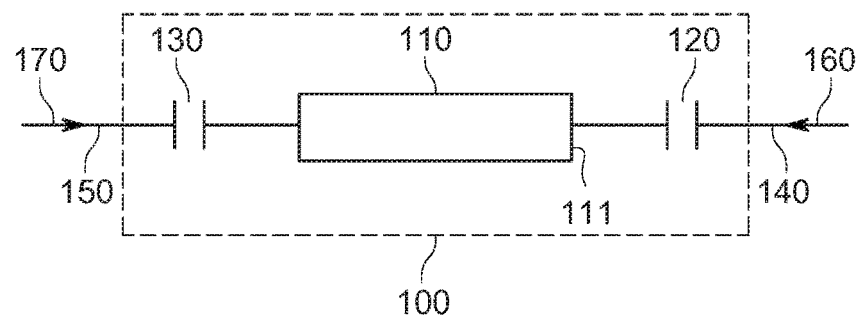
FIG. 1 illustrates an example of a torque transfer drive system.

The Figures illustrate a driveline system 200 (e.g., FIG. 2A) comprising: a prime mover 210 configured to provide torque to at least a first group of wheels 230; an electric machine 220 configured to provide torque to at least a second group of wheels 240; a torque transfer drive 110 comprising a first side 111 and a second side 112 and configured to enable torque generated by the prime mover 210 to be provided from the first side 111 to the second side 112 for provision to the second group of wheels 240; a first disconnect device 120 configured to, in a first connect configuration, transmit torque from the prime mover 210 to the first side 111 of the torque transfer drive 110 and, in a first disconnect configuration, prevent transmission of torque from the prime mover 210 to the first side 111 of the torque transfer drive 110; and a second disconnect device 130 configured to, in a second connect configuration, transmit torque between the electric machine 220 and the second side 112 of the torque transfer drive 110 and, in a second disconnect configuration, prevent transmission of torque between the electric machine 220 and the second side 112 of the torque transfer drive 110.

In some but not necessarily all examples the driveline system 200 is a North-South (longitudinally mounted) driveline.

It is to be appreciated that in some disconnect devices there may be some small inherent torque transmission even in a disconnect configuration. Therefore it should be understood that all references to preventing transmission of torque by means of a disconnect device or fully operatively decoupling by means of a disconnect device or isolating by means of a disconnect device include substantially preventing transmission of torque by means of a disconnect device or substantially fully operatively decoupling by means of a disconnect device or substantially isolating by means of a disconnect device respectively.

FIG. 1 illustrates an example of a torque transfer drive system 100. The torque transfer drive system 100 comprises a torque transfer drive 110 which has a first side 111 and a second side 112. The torque transfer drive 110 is configured to enable torque to be transmitted between the first side 111 and the second side 112. In some examples the torque transfer drive 110 is configured to enable torque 160 output from a first motor via a first driveline 140 to be provided from the first side 111 to the second side 112 for provision to a second driveline 150. In some examples the torque transfer drive 110 is configured to enable torque 170 output from the second motor via the second driveline 150 to be provided from the second side 112 to the first side 111 for provision to the first driveline 140.

In some but not necessarily all examples the first driveline 140 is a rear driveline of a motor vehicle and the second driveline 150 is a front driveline of the motor vehicle. Torque is transferred between the front and rear drivelines via a transfer case. In the present example, the transfer case comprises the torque transfer drive 110 which is configured to facilitate the transfer of torque between the front and rear drivelines. In some examples the torque transfer drive 110 may be a chain drive. In other examples the torque transfer drive 110 may be a set of gears.

The torque transfer drive system 100 illustrated in FIG. 1 also comprises a first disconnect device 120. The first disconnect device 120 has a first connect configuration and a first disconnect configuration. In the first connect configuration the first disconnect device 120 is configured to transmit torque between the first driveline 140 and the first side 111 of the torque transfer drive 110. In the first connect configuration the first disconnect device 120 is configured to transmit torque 160 received from the first motor via the first driveline 140 to the first side 111 of the torque transfer drive 110. In some examples, in the first connect configuration, the first disconnect device 120 is also configured to transmit torque 170 from the second driveline 150, received at the first side 111 (from the second side 112) of the torque transfer drive 110, to the first driveline 140. In the first disconnect configuration the first disconnect device 120 is configured to prevent transmission of torque 160 from the first driveline 140 to the first side 111 of the torque transfer drive 110.

The torque transfer drive system 100 illustrated in FIG. 1 also comprises a second disconnect device 130. The second disconnect device 130 has a second connect configuration and a second disconnect configuration. In the second connect configuration the second disconnect device 130 is configured to transmit torque between the second driveline 150 and the second side 112 of the torque transfer drive 110. In the second connect configuration the second disconnect device 130 is configured to transmit torque 170 received from a second motor via the second driveline 150 to the second side 112 of the torque transfer drive 110. In some examples, in the second connect configuration, the second disconnect device 130 is also configured to transmit torque 160 from the first driveline 140, received at the second side 112 (from the first side 111) of the torque transfer drive 110, to the second driveline 150. In the second disconnect configuration the second disconnect device 130 is configured to prevent transmission of torque 170 from the second driveline 150 to the second side 112 of the torque transfer drive 110. The second driveline 150 is a different driveline to the first driveline 140.

In some but not necessarily all examples the first disconnect device 120 is a continuously variable device and second disconnect device 130 is an on/off device.

In some examples, in the first connect configuration the first disconnect device 120 is configured to modulate the amount of torque 160 from the first motor via the first driveline that is transmitted to the first side 111 of the torque transfer drive 110. In the first disconnect configuration the first disconnect device 120 is configured to fully operatively decouple the first driveline 140 from the torque transfer drive 110 such than none of the torque 160 from the first motor via the first driveline 140 is transferred from the first side 111 of the torque transfer drive 110 to the second side 112 of the torque transfer drive 110.

Figure 2A:
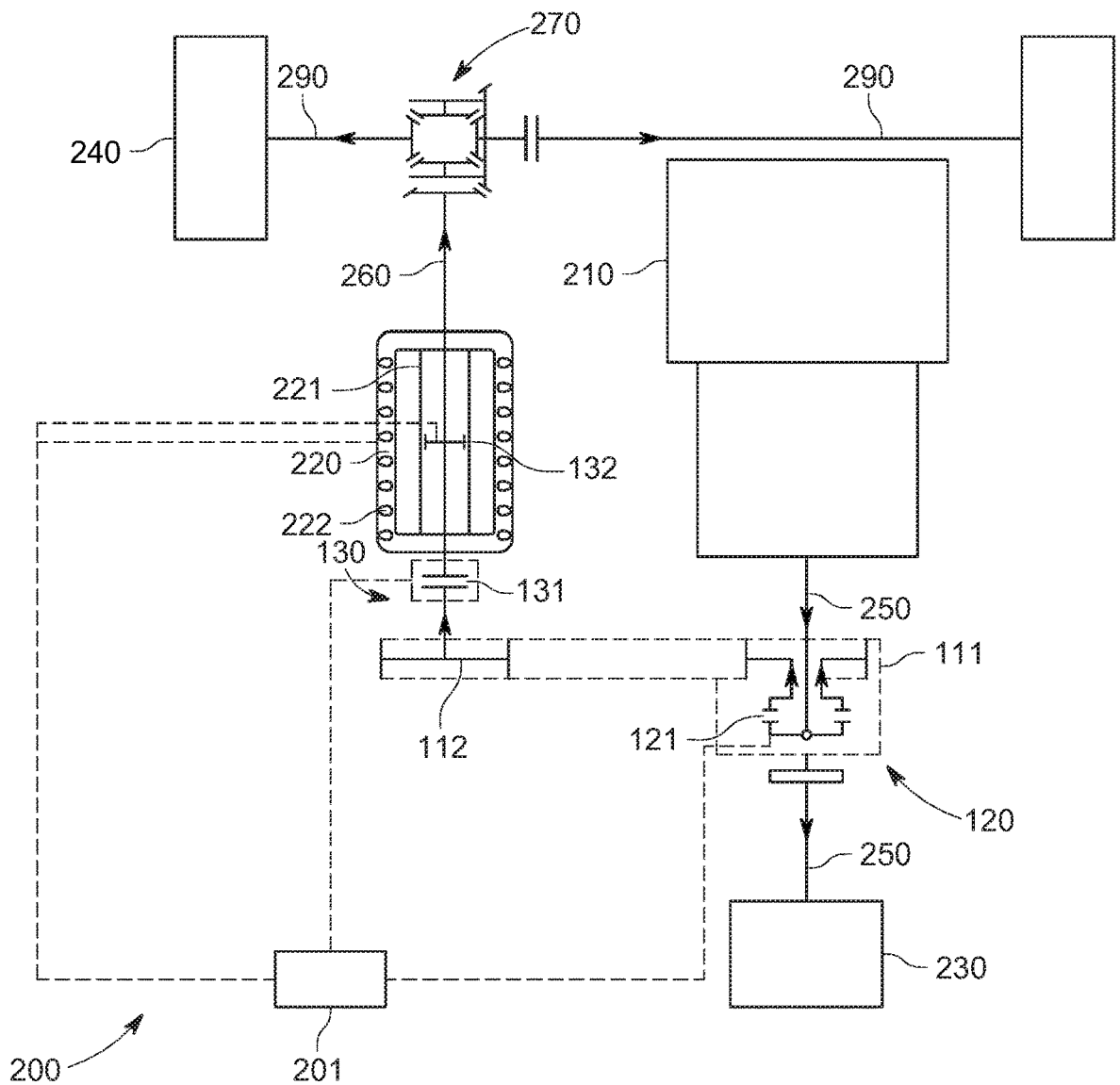
FIGS. 2A, 2B, 2C, and 2D illustrate examples of a driveline system.

In some but not necessarily all examples the first disconnect device 120 comprises a first clutch 121 (FIG. 2A). The first clutch 121 may be a friction clutch, for example a multi-plate clutch (MPC) such as a multi-plate wet clutch or a multi-plate dry clutch. In some examples, the first clutch 121 enables clutch slip. In some examples, the first disconnect device 120 also comprises a locking device configured to lock the first clutch 121.

FIG. 2A illustrates a driveline system 200 comprising a prime mover 210, an electric machine 220, and a torque transfer drive system 100, for example, as illustrated in FIG. 1.

In some examples the prime mover 210 comprises an internal combustion engine (ICE). Alternatively or in addition the prime mover 210 comprises an electric machine, different to the electric machine 220. The prime mover 210 is configured to provide torque 160 to at least a first group of wheels 230. The prime mover 210 operates as the first motor described in relation to FIG. 1.

The first group of wheels 230 comprise, in some examples, a plurality of wheels, for example the rear wheels of a motor vehicle. Torque is provided to the first group of wheels 230 via a first propshaft 250 driven by torque 160 output from the prime mover 210. In the example where the first group of wheels 230 are the rear wheel of a motor vehicle, the first propshaft 250 is a rear propshaft and provides torque 160 from the prime mover 210 to a rear drive unit (not shown) comprising a ring gear (not shown) which drives the rear side shafts (not shown) on which each wheel in the first group of wheels 230 is mounted.

The electric machine 220 comprises a rotor 221 and a stator 222. The electric machine 220 is configured to operate as a motor, for example the second motor described in relation to FIG. 1, in order to provide torque to at least a second group of wheels 240. Alternatively or in addition the electric machine 220 is configured to operate as a generator in order to convert mechanical energy, such as the rotation of the rotor 221, into electrical energy which can be stored and may, for example, be subsequently used to power either the electric machine 220 or the electric machine comprised in the prime mover 210 (if any).

The second group of wheels 240 comprise, in some examples, a plurality of wheels, for example the front wheels of a motor vehicle. Torque is provided to the second group of wheels 240 via a second propshaft 260. In the example where the second group of wheels 240 are the front wheel of a motor vehicle, the second propshaft 260 is a front propshaft and provides torque to a front drive unit 270 (FIG. 2B) comprising a ring gear (not shown) which drives the front side shafts 290 (FIG. 2B) on which each wheel in the second group of wheels 240 is mounted.

Figure 2B:
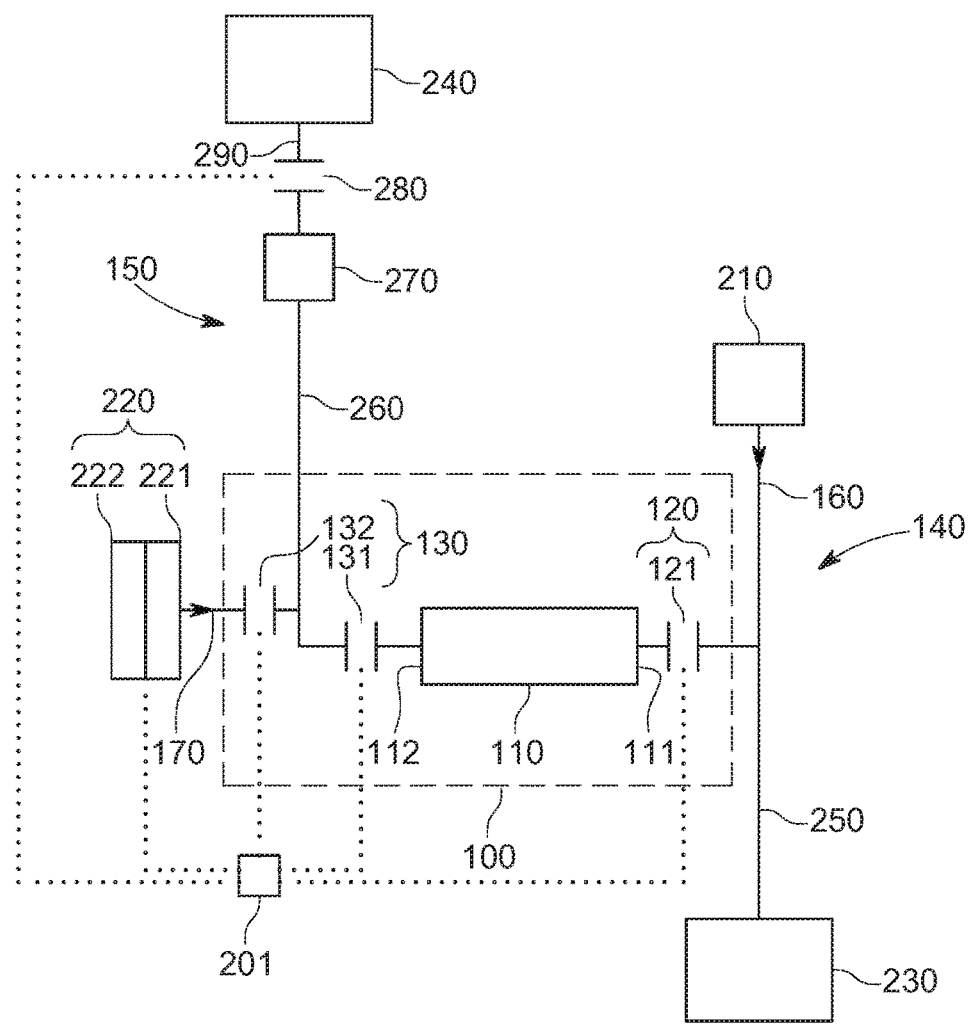

In some examples, for example as illustrated in FIG. 2B, but not necessarily all examples, a third disconnect device 280 is configured to, in a fifth connect configuration, enable transmission of torque between the second propshaft 260 and the second group of wheels 240 and, in a fifth disconnect configuration, prevent the transmission of torque between the second propshaft 260 and the second group of wheels 240. The third disconnect device comprises one or more clutches, such as, for example, dog clutches.

In the example of FIG. 2A, the torque transfer drive system 100 is disposed between the first propshaft 250 and the second group of wheels 240.

The first disconnect device 120 comprises the first clutch 121. The first clutch 121 is configured to, in the first connect configuration, connect the first propshaft 250 to the first side 111 of the torque transfer drive 110 and, in the first disconnect configuration, disconnect the first propshaft 250 from the first side 111 of the torque transfer drive 110. When the first propshaft 250 is connected to the first side 111 of the torque transfer drive 110, torque can be transmitted between the first propshaft 250 and the first side 111 of the torque transfer drive 110. When the first propshaft 250 is disconnected from the first side 111 of the torque transfer drive 110, transmission of torque between the first propshaft 250 and the first side 111 of the torque transfer drive 110 is prevented.

The second disconnect device 130 comprises a second clutch 131. The second clutch 131 is configured to, in a third connect configuration, connect the second propshaft 260 to the second side 112 of the torque transfer drive 110 and, in a third disconnect configuration, disconnect the second propshaft 260 from the second side 112 of the torque transfer drive 110. When the second propshaft 260 is connected to the second side 112 of the torque transfer drive 110, torque can be transmitted between the second propshaft 260 and the second side 112 of the torque transfer drive 110. When the second propshaft 260 is disconnected from the second side 112 of the torque transfer drive 110, transmission of torque between the second propshaft 260 and the second side 112 of the torque transfer drive 110 is prevented.

In the example of FIG. 2A, the second disconnect device 130 comprises a third clutch 132 in addition to the second clutch 131, however in some examples the second disconnect device 130 may comprise the second clutch 131 and not the third clutch 132 or the third clutch 132 and not the second clutch 131. The third clutch 132 is configured to, in a fourth connect configuration, transmit torque between the electric machine 220 and the second propshaft 260 and, in a fourth disconnect configuration, prevent transmission of torque between the electric machine 220 and the second propshaft 260.

When the second disconnect device 130 is in the second connect configuration, the second clutch 131 (if present) is in the third connect configuration and the third clutch 132 (if present) is in the fourth connect configuration. When the second disconnect device 130 is in the second disconnect configuration, at least one of the second clutch 131 and the third clutch 132 is in the third disconnect configuration or the fourth disconnect configuration respectively. Therefore the second disconnect device 130 configured to, in a second connect configuration, transmit torque between the electric machine 220 and the second side 112 of the torque transfer drive 110 and, in a second disconnect configuration, prevent transmission of torque between the electric machine 220 and the second side 112 of the torque transfer drive 110.

The second clutch 131 and the third clutch 132 are, in some examples, locking clutches such as dog clutches. The second clutch 131 and the third clutch 132 are configured to prevent clutch slip which may lead to energy losses due to heat generation. In the third connect configuration the second clutch 131 is configured to transmit all or substantially all torque between the second propshaft 260 and the second side 112 of the torque transfer drive 110. In the fourth connect configuration the third clutch 132 is configured to transmit all or substantially all torque between the electric machine 220 and the second propshaft 260.

Figure 2C:
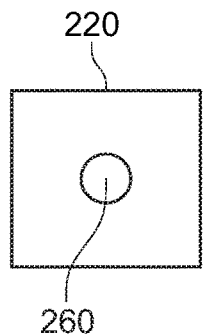

As illustrated in the example of FIG. 2C, the electric machine 220 is concentrically mounted on the second propshaft 260. This advantageously minimises the space required to accommodate the electric machine 220 in the driveline system 200. In this example the third clutch 131 may also be disposed concentrically about the second propshaft 260.

Figure 2D:
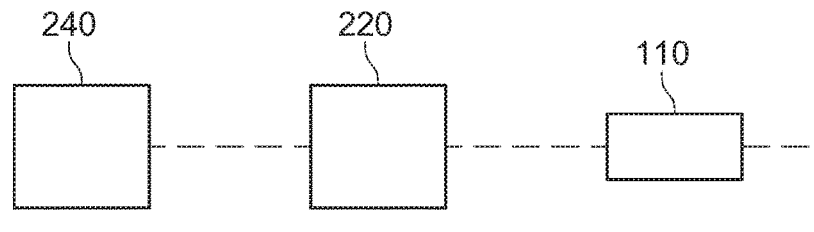

Alternatively, as illustrated in the example of FIG. 2D, the electric machine 220 is connected in series between the second side 112 of the torque transfer drive 110 and the second group of wheels 240.

Returning to FIG. 2A, a controller 201 is configured to control the first disconnect device 120 and/or the second disconnect device 130. In some examples the controller 201 is configured to control one or more of the first clutch 121, the second clutch 131 (if present), the third clutch 132 (if present), and the electric machine 220. In some examples the controller 201 is also configured to control the third disconnect device 280 illustrated in FIG. 2B. The control methodology used by the controller 201 is described in more detail with reference to FIGS. 3A, 3B, and 4. The controller 201 may be an electronic controller. The electronic controller may be a programmed processer, such a filed programmable gate arrays, application specific circuits, or a programmable processor and memory with stored computer code combination.

Figure 3A:
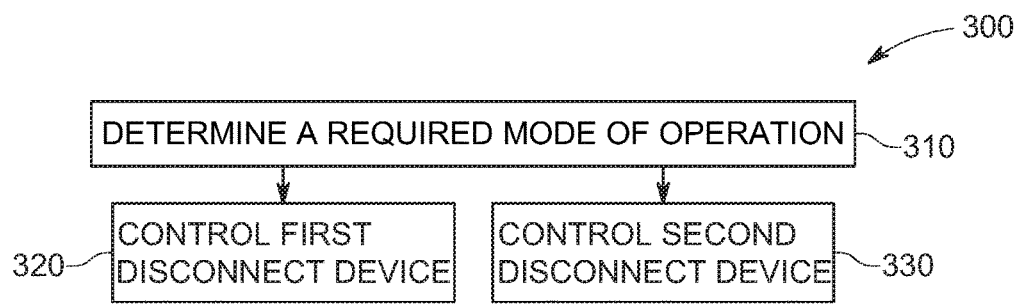
FIGS. 3A and 3B illustrate examples of a method of controlling a driveline system.

FIG. 3A illustrates an example of a method 300 of controlling the driveline system 200 illustrated in any of FIGS. 2A, 2B, 2C, or 2D.

At block 310 of the method 300, a required mode of operation is determined. In some but not necessarily all examples the mode of operation may be determined based on the value of one or more vehicle operating parameters.

At block 320 of the method 300, the first disconnect device 120 is controlled to have the first connect configuration or the first disconnect configuration in dependence upon the required mode of operation. In some examples controlling 320 the first disconnect device in dependence on a required mode of operation comprises controlling the first clutch 121.

At block 330 of the method 300, the second disconnect device 130 is controlled to have the second connect configuration or the second disconnect configuration in dependence upon the required mode of operation.

Figure 3B:
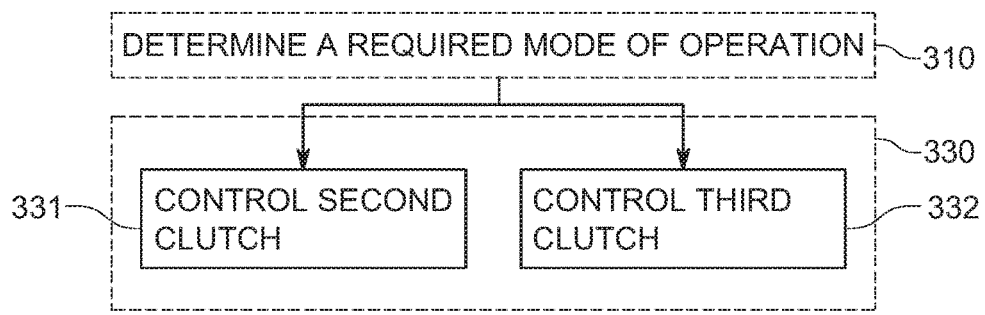

In the example of FIG. 3B, controlling 330 the second disconnect device 130 in dependence on a required mode of operation comprises controlling 331 the second clutch 131 and controlling 332 the third clutch 132.

The first clutch 121, the second clutch 131, and the third clutch 132 can all be independently controlled. The first clutch 121 can be controlled 320 to have the first connect configuration or the first disconnect configuration independently to the control 331 of the second clutch 131 and the control 332 of the third clutch 132. Likewise, the second clutch 131 can be controlled 331 to have the third connect configuration or the third disconnect configuration independently to the control 320 of the first clutch 121 and the control 332 of the third clutch 132. Likewise, the third clutch 132 can be controlled 332 to have the fourth connect configuration or the fourth disconnect configuration independently to the control 320 of the first clutch 121 and the control 331 of the second clutch 131. In some examples the control 320, 331, 332 of each of the first clutch 121, the second clutch 131, and the third clutch 132 is related by the required mode of operation.

The controller 201 (see FIG. 2A) has the capability of controlling 320, 331, 332 each of the first clutch 121, the second clutch 131, and the third clutch 132 individually. In some examples, however, the controller 201 is configured the control 320, 331, 332 each of the first clutch 121, the second clutch 131, and the third clutch 132 in dependence on the required mode of operation.

Figure 4:
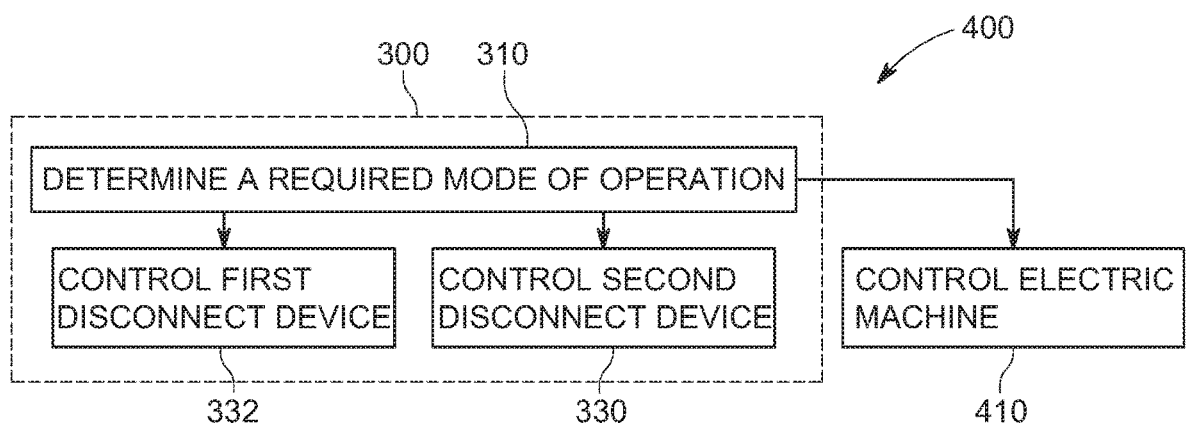
FIG. 4 illustrates an example of a method of controlling a driveline system.

FIG. 4 illustrates an example of a method 400 of controlling the driveline system 200 illustrated in any of FIGS. 2A, 2B, 2C, or 2D.

The method 400 comprises the method 300 and the additional block 410 at which the electric machine 220 is controlled to operate as a motor or as a generator in dependence upon the required mode of operation.

Some examples of modes of operation are given in the following tables:

|  | Mode 1 | Mode 2 | Mode 3 |
|---|---|---|---|
| Electric machine 220 | — | — | motor |
| First clutch 121 | disconnected | connected | connected |
| Second clutch 131 | — | connected | connected |
| Third clutch 132 | — | disconnected | connected |

|  | Mode 4 | Mode 5 | Mode 6 |
|---|---|---|---|
| Electric machine 220 | generator | motor | generator |
| First clutch 121 | connected | — | — |
| Second clutch 131 | connected | disconnected | disconnected |
| Third clutch 132 | connected | connected | connected |

|  | Mode 7 |
|---|---|
| Electric machine 220 | motor |
| First clutch 121 | disconnected |
| Second clutch 131 | disconnected |
| Third clutch 132 | connected |

In these examples the first group of wheels 230 are rear wheels and the second group of wheels 240 are front wheels. The first propshaft 250 is the rear propshaft and the second propshaft 260 is the front propshaft.

Mode 1 corresponds to a rear wheel drive (RWD) mode. When it is detected that RWD is required the first clutch 121 is controlled to have a first disconnect configuration. Torque 160 output from the prime mover 210 is provided to the rear wheels 230 via the rear propshaft 250 but not the front wheels 240. In some examples the transmission of torque between the front wheels 240 and the front propshaft 260 is prevented by means of the third disconnect device 280 having the fifth disconnect configuration. Advantageously this minimises drag loses that would otherwise have arisen from the rotation of the front propshaft 260 and front drive unit 270 caused by the rotation of the front wheels 240. The electric machine 220 and torque transfer drive 110 are also isolated from torque from the rotation of the front wheels 240 in this example and thus any drag losses that would have resulted from the rotation of these components is also minimised. In some examples torque transfer drive 110 is isolated from torque from the rotation of the front wheels 240 by means of the second clutch 131 having the third disconnect configuration whilst the third disconnect device 280 has the fifth connect configuration. In some examples electric machine 220 is isolated from torque from the rotation of the front wheels 240 by means of the third clutch 132 having the fourth disconnect configuration whilst the third disconnect device 280 has the fifth connect configuration.

Mode 2 corresponds to a four-wheel drive (4WD) mode. When it is detected that 4WD is required the first clutch 121 is controlled to have a first connect configuration, the second clutch 131 is controlled to have a third connect configuration, the third clutch 132 is controlled to have a fourth disconnect configuration, and the third disconnect device 280 is controlled to have the fifth connect configuration. Torque 160 output from the prime mover 210 is provided to the rear wheels 230 via the rear propshaft 250 and is transmitted to the first side 111 of the torque transfer drive 110 via the first clutch 121. The first clutch 121 is configured to modulate the amount of torque 160 transmitted to the first side 111 of the torque transfer drive 110. The torque transfer drive 110 provides the torque 160 from the first side 111 to the second side 112. The second clutch 131 enables the transmission of torque 160 to the front propshaft 260.

The front propshaft 260 provides the torque 160 to the front wheels 240. The electric machine 220 is fully operatively decoupled from the front propshaft 260 by means of the third clutch 132 therefore minimising drag losses that would otherwise have resulted from the rotation of the inert rotor 221.

In some examples, it may be determined that 4WD mode is required based on an immediate need for 4WD mode, for example when a sensor detects that wheel slip exceeds a predetermined threshold value. In other examples, it may be determined that 4WD mode is required in dependence upon a prediction, by means of the controller 201, that conditions necessitating 4WD mode will occur within a prescribed period of time. In some examples the prediction is made by the controller 201 based on sensor inputs indicative of the terrain over which the vehicle is travelling (e.g., icy roads or off-road terrain such as mud or sand).

In order to enable the driveline system 200 to transition from mode 1 (RWD) to mode 2 (4WD) during driving operation the rotational speeds of the front wheels 240, the front propshaft 260, and the torque transfer drive 110 are substantially synchronised. At a first time, if the second clutch 131 and the third disconnect device 280 are not already in their respective disconnect configurations they are controlled to have the third disconnect configuration and fifth disconnect configuration respectively. If the third clutch 132 is not already in the fourth connect configuration it is controlled to have the fourth disconnect configuration. The first clutch 121, as per mode 1, is in the first disconnect configuration.

At a second time the electric machine 220 is controlled to operate as a motor. The electric machine 220 is controlled to increase the rotational speed of the front propshaft 260 to the rotational speed of the front wheels 240 and subsequently the third disconnect device 280 is controlled to have the fifth connect configuration. The first clutch 121 is controlled to modulate the amount of torque 160 output from the prime mover that is transmitted to the first side 111 of the torque transfer drive 110 such that the rotational speed of the second side 112 is increased to the rotational speed of the front propshaft 260. Once the rotational speed of the second side 112 of the torque transfer drive 110 matches the rotational speed of the front propshaft 260, at a third time, the second clutch 131 is controlled to have the third connect configuration. In order to complete the transition to mode 2, the third clutch 132 is simultaneously or subsequently controlled to have a fourth disconnect configuration.

In another example, in order to enable the driveline system 200 to transition from mode 1 (RWD) to mode 2 (4WD) during driving operation, at a first time, if the third disconnect device 280 is not already in the fifth disconnect configuration it is controlled to have the fifth disconnect configuration. If the third clutch 132 is not already in the fourth connect configuration it is controlled to have the fourth disconnect configuration. The first clutch 121, as per mode 1, is in the first disconnect configuration.

In this example, at a second time, the electric machine 220 is controlled to operate as a motor and output torque. Simultaneously, or substantially immediately thereafter, the second clutch 131 is controlled to have the third connect configuration, if it is not already in the third connect configuration. The electric machine 220 is controlled to increase the rotational speed of the front propshaft 260 to the rotational speed of the front wheels 240 and subsequently the third disconnect device 280 is controlled to have the fifth connect configuration. The first clutch 121 is simultaneously or subsequently controlled to have the first connect configuration. In order to complete the transition to mode 2, the third clutch 132 is simultaneously or subsequently controlled to have a fourth disconnect configuration.

The electric machine 220 is better for matching speeds than the first clutch 121 because the rotational speed of the rotor 221 with respect to the stator 222 can be directly controlled to match the rotational speed of the front wheels 240. In contrast only the displacement of the clutch plates in the first clutch 121 can be directly controlled. The torque transmitted across the first clutch 121 depends on the displacement of the clutch plates and the speed of the front propshaft 260 is dependent upon the torque transmitted. Feedback on the relationship between the displacement of the clutch plates in the first clutch 121 and the speed of the front propshaft 260 is obtained and the displacement of the clutch plates in the first clutch 121 then further controlled in dependence upon this feedback.

Mode 3 corresponds to a 4WD with torque boost mode. When it is detected that 4WD with torque boost is required the first clutch 121 is controlled to have a first connect configuration, the second clutch 131 is controlled to have a third connect configuration, and the third clutch 132 is controlled to have a fourth connect configuration. As per mode 1 (4WD mode) torque 160 output from the prime mover 210 is provided to the rear wheels 230 and to the front wheels 240. In mode 2, unlike in mode 1, the electric machine 220 is operated as a motor and provides additional torque 170 to the front propshaft 260 via third clutch 132.

Mode 4 corresponds to a battery charging mode. In some but not necessarily all examples, when the state of charge of a vehicle battery is below a predetermined threshold, increasing the state of charge of the vehicle battery is prioritised over fuel consumption. In such an instance it is detected that battery charging is required and the electric machine 220 is operated as a generator while the first clutch 121 is controlled to have a first connect configuration, the second clutch 131 is controlled to have a third connect configuration, and the third clutch 132 is controlled to have a fourth connect configuration. Torque 160 output from the prime mover 210 is therefore provided to the electric machine 220 and converted into electrical energy to replenish the vehicle battery.

Mode 5 corresponds to a front wheel drive (FWD) mode. When it is detected that FWD is required the electric machine 220 is controlled to operate as a motor, the second clutch 131 is controlled to have a third disconnect configuration, and the third clutch 132 is controlled to have a fourth connect configuration. The prime mover 210 is turned off. Torque 170 output from the electric machine 220 is provided to the front wheels 240 via the front propshaft 260 and the third clutch 132. The second clutch 131 is controlled to prevent the transmission of torque 170 output from the electric machine 220 to the second side 112 of the torque transfer device 110.

The FWD mode may be used, for example, for low speed manoeuvring such as parking and for driving in slow moving traffic. Advantageously instead of turning the prime mover 210 on or off, the prime mover 210 may remain while the electric machine 220 provides all the driving torque.

Advantageously, by isolating the torque transfer drive 110 from the rotating front propshaft 260 energy losses involved in spinning up the torque transfer drive 110 are reduced and in some examples eliminated. Some examples of energy losses involved in spinning up the torque transfer drive 110 include: energy losses due to the motion of the torque transfer drive 110 churning the oil through which it moves; energy losses due to bearing friction; and, in the case where the torque transfer drive 110 is a chain drive, energy losses due to chain stretching.

It has been observed by the inventor that, in some but not necessarily all situations where the torque output is low (e.g., less than 250 Nm), the torque loss due to spinning up the torque transfer drive 110 is in the range of 1.5 to 15 percent of the torque output. The percentage of the torque output lost due to spinning up the torque transfer drive 110 increases as the torque output decreases. In some situations the percentage of the torque output lost due to spinning up the torque transfer drive 110 is greater than 15 percent.

In some but not necessarily all examples, while providing FWD using the electric machine 220, the first clutch 121 may be controlled to have a first disconnect configuration and the prime mover 210 is turned on in order to drive the rear wheels 230. Advantageously, torque output lost due to spinning up the torque transfer drive is minimised by disconnecting both the first side 111 and the second side 112 of the torque transfer drive 110 from the rotating front and rear propshafts 250, 260, whilst the front wheels 240 are driven by the electric machine 220 and the rear wheels 230 are driven by the prime mover 210.

Mode 6 corresponds to a regenerative braking mode. When it is detected that regenerative braking is required the electric machine 220 is controlled to operate as a generator, the second clutch 131 is controlled to have a third disconnect configuration, and the third clutch 132 is controlled to have a fourth connect configuration. If present, the third disconnect device 280 is controlled to have a fifth connect configuration. The rotation of the front wheels 240 causes the front propshaft 260 to rotate. The third clutch 132 is controlled to transmit torque from the front propshaft 260 to the electric machine 220. The second clutch 131 is controlled to prevent the transmission of torque from the front propshaft 260 to the second side 112 of the torque transfer device 110. Advantageously, energy losses due to spinning up the torque transfer drive 110 are reduced and in some examples eliminated. Therefore the electric machine 220 generates more electrical energy for the same braking effect and the state of charge of the vehicle battery is increased at a higher rate.

The torque transfer drive system 100 therefore advantageously enables a reduction in energy losses when the driveline system 200 is operating in FWD mode or RWD mode or regenerative braking mode because the torque transfer drive 110 can be fully operatively decoupled from whichever driveline (e.g., front or rear) is being driven.

Mode 7 corresponds to a stability control mode. Under certain scenarios when the driveline system 200 is operating in a 4WD mode, the torque requirements of the front wheels 240 may differ to the rear wheels 230. For example, it may be determined that more traction is available at the front wheels 240 than at the rear wheels 230 and so a greater amount of torque can be delivered to the front wheels 240 than the rear wheels 230. In another example, it may be determined by an ABS system that positive torque is required to be delivered to the front wheels 240 during a braking event in order to regain traction following wheel slip, whereas at the same time positive torque is not required to be delivered to the rear wheels 230. In such scenarios, there is therefore a requirement to independently control the amount of torque delivered to each of the front wheels 240 and rear wheels 230. This could be achieved by controlling the first clutch 121 to have the first disconnect configuration, controlling the second clutch 131 to have the third disconnect configuration, controlling the third clutch 132 to have the fourth connect configuration, and independently supplying torque to the rear wheels 230 and the front wheels 240 using the electric machine 240 respectively.

Figure 5:
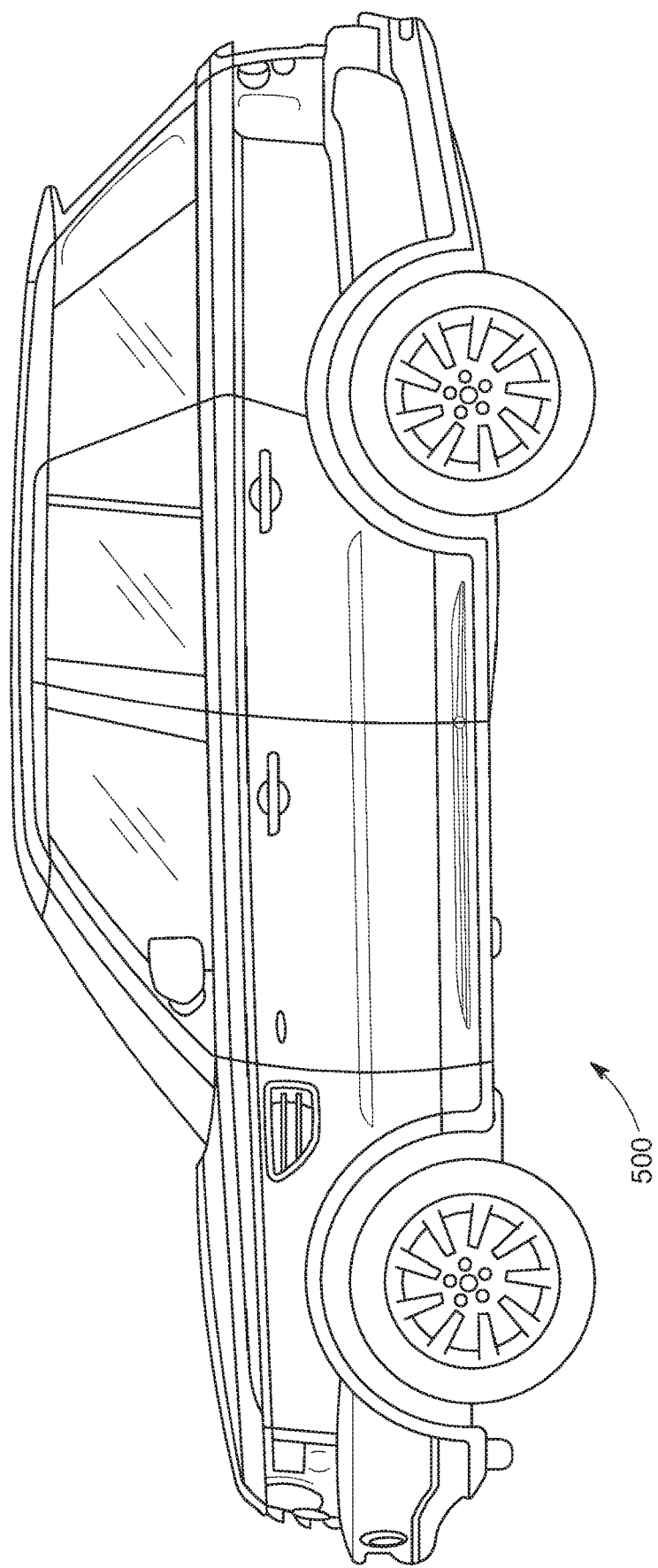
FIG. 5 illustrates an example of a vehicle.

FIG. 5 illustrates an example of a vehicle 500 comprising the driveline system 200. In some examples, the vehicle 500 comprises the controller 201.

The controller 201 is configured to perform the method illustrated in any of FIGS. 3A, 3B, and 4.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The blocks illustrated in FIGS. 3A, 3B, and 4 may represent steps in a method and/or sections of code in a computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A driveline system comprising:
    a prime mover configured to provide torque to at least a first group of wheels via a first driveline;
    an electric machine configured to provide torque to at least a second group of wheels;
    a torque transfer drive comprising a first side and a second side and configured to enable torque generated by the prime mover to be provided from the first side to the second side for provision to the second group of wheels;
    a first disconnect device configured to, in a first connect configuration, transmit torque from the prime mover to the first side of the torque transfer drive and, in a first disconnect configuration, prevent transmission of torque from the prime mover to the first side of the torque transfer drive and operatively decouple the first driveline from the torque transfer drive;
    a second disconnect device configured to, in a second connect configuration, transmit torque between the electric machine and the second side of the torque transfer drive and, in a second disconnect configuration, prevent transmission of torque between the electric machine and the second side of the torque transfer drive;
    wherein the electric machine is concentrically mounted on a second propshaft, and wherein the second disconnect device comprises a second clutch configured to, in a third connect configuration, connect the second propshaft to the second side of the torque transfer drive and, in a third disconnect configuration, disconnect the second propshaft from the second side of the torque transfer drive; and
    wherein the second disconnect device comprises a third clutch configured to, in a fourth connect configuration, transmit torque between the electric machine and the second propshaft and, in a fourth disconnect configuration, prevent transmission of torque between the electric machine and the second propshaft.

2. The driveline system as claimed in claim 1, wherein the first disconnect device comprises a first clutch.

3. The driveline system as claimed in claim 2, wherein the first clutch is configured to, in the first connect configuration, connect a first propshaft to the first side of the torque transfer drive and, in the first disconnect configuration, disconnect the first propshaft from the first side of the torque transfer drive.

4. The driveline system as claimed in claim 2, wherein the first clutch is configured to, in the first connect configuration, connect a first propshaft to the first side of the torque transfer drive and, in the first disconnect configuration, disconnect the first propshaft from the first side of the torque transfer drive, wherein the first propshaft is driven by torque output from the prime mover.

5. The driveline system as claimed in claim 1, wherein when the second disconnect device is in the second connect configuration, the second clutch is in the third connect configuration and the third clutch is in the fourth connect configuration.

6. The driveline system as claimed in claim 1, wherein when the second disconnect device is in the second disconnect configuration, at least one of the second clutch and the third clutch is in the third disconnect configuration or the fourth disconnect configuration respectively.

7. The driveline system as claimed in claim 1, wherein the electric machine is connected in series between the second side of the torque transfer drive and the second group of wheels.

8. The driveline system as claimed in claim 1, wherein a third disconnect device is configured to, in a fifth connect configuration, enable transmission of torque between the second propshaft and the second group of wheels and, in a fifth disconnect configuration, prevent the transmission of torque between the second propshaft and the second group of wheels.

9. A method of controlling the driveline system of claim 1, comprising:
   determining a required mode of operation; and
   in dependence upon the required mode of operation,
      controlling the first disconnect device to have the first connect configuration or the first disconnect configuration; and
      controlling the second disconnect device to have the second connect configuration or the second disconnect configuration.

10. The method as claimed in claim 9, wherein controlling the second disconnect device to have the second disconnect configuration comprises controlling the second clutch to have the third disconnect configuration.

11. The method as claimed in claim 9, wherein controlling the second disconnect device to have the second disconnect configuration comprises controlling the third clutch to have the fourth disconnect configuration.

12. The method as claimed in claim 9, comprising, in dependence upon the required mode of operation, controlling the electric machine to operate as a motor or as a generator.

13. A controller configured to perform the method of claim 9.

14. A vehicle comprising the driveline system of claim 1.

15. A method of controlling a driveline system that includes a prime mover configured to provide torque to at least a first group of wheels via a first driveline; an electric machine configured to provide torque to at least a second group of wheels; a torque transfer drive comprising a first side and a second side and configured to enable torque generated by the prime mover to be provided from the first side to the second side for provision to the second group of wheels; a first disconnect device configured to, in a first connect configuration, transmit torque from the prime mover to the first side of the torque transfer drive and, in a first disconnect configuration, prevent transmission of torque from the prime mover to the first side of the torque transfer drive and operatively decouple the first driveline from the torque transfer drive; and a second disconnect device configured to, in a second connect configuration, transmit torque between the electric machine and the second side of the torque transfer drive and, in a second disconnect configuration, prevent transmission of torque between the electric machine and the second side of the torque transfer drive, the method comprising:
   determining a required mode of operation; and
   in dependence upon the required mode of operation,
      controlling the electric machine to operate as a motor or as a generator;
      controlling the first disconnect device to have the first connect configuration or the first disconnect configuration; and
      controlling the second disconnect device to have the second connect configuration or the second disconnect configuration.

* * * * *